April 7, 1925.

D. J. PEELER

PISTON RING

Filed Feb. 10, 1923

INVENTOR.

D. J. Peeler:

BY

Geo. F. Kimmel, ATTORNEY.

Patented Apr. 7, 1925.

1,532,938

UNITED STATES PATENT OFFICE.

DOCK J. PEELER, OF NASHVILLE, TENNESSEE.

PISTON RING.

Application filed February 10, 1923. Serial No. 618,273.

*To all whom it may concern:*

Be it known that I, Dock J. Peeler, a citizen of the United States, residing at Nashville, in the county of Davidson and State of Tennessee, have invented certain new and useful Improvements in Piston Rings, of which the following is a specification.

This invention relates to piston rings and has for its object to provide a ring of such class, in the manner as hereinafter referred to, for overcoming the pumping of oil into the combustion chamber of the engine, as well as further providing for increased lubrication, due to a lubricant holding or trapping action set up by the rings when mounted in operative relation with respect to the piston head.

Further objects of the invention are to provide a piston ring which is simple in its construction and arrangement, compressible, strong, durable, thoroughly efficient in its use, conveniently positioned within a piston head groove, and inexpensive to manufacture.

With the foregoing and other objects in view, the invention consists of the novel construction of piston ring as hereinafter specifically described and illustrated in the accompanying drawings, wherein is shown the preferred embodiment of the invention, but it is to be understood that changes, variations and modifications can be resorted to which fall within the scope of the claims hereunto appended.

In the drawings wherein like reference characters denote corresponding parts throughout the several views:—

Figure 1:
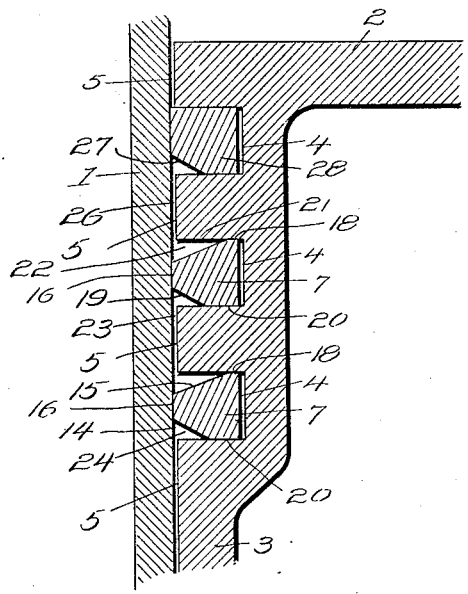
Figure 1 is a fragmentary sectional view, of a cylinder and a piston head, showing the adaptation in connection with the piston head or the piston ring in accordance with this invention.

Referring to the drawings in detail, 1 denotes the cylinder, 2 a piston head, 3 the piston skirt, 4 piston ring grooves formed in the head 2, and 5 lands at the sides of the grooves 4.

A piston ring in accordance with this invention comprises a compressible split annular metallic body 7 with the ends 8, 9 thereof reduced to form oppositely disposed shoulders 10, 11, respectively, and oppositely extending ledges 12, 13, respectively, whereby the ledges provide for the overlapping of the split ends 8, 9, and the shoulders limit the compressed action of the body 7.

The outer diameter of the body 7, when mounted in the groove 4, is such as to provide for the projecting of the ring from the piston head 2, to engage the cylinder wall 14, or in other words, the width of the body 7 of the ring is greater than the depth of the groove 4, under such conditions the ring when mounted in the piston head, will project beyond the piston head so as to engage the wall 14.

The forward face 15 of the body 7, is beveled, and the bevel extends from the outer edge 16, of the body 7, to a point in close proximity to the inner edge 17, of said body 7, thereby providing the inner marginal portion of the forward face 15, of the body 7, with a flat narrow annular surface 18, disposed at an angle with respect to the inner terminus of the bevel surface of said forward face 15 of the body portion 7.

The rear face of the body 7 is beveled in an opposite direction with respect to the beveled forward face of said body 7, as at 19, which extends preferably at an angle of 45 degrees. The beveled surface 19 extends from the outer edge 16 of the body 7 and terminates medially of the width of the rear face of said body 7, so as to provide an inner marginal portion on the rear face of the body 7. The said inner marginal portion bearing a flat annular face 20 of greater width than the surface 18.

With respect to a ring, the beveled surface 15 thereof, in connection with the wall 21 of the groove 4, provides a lubricant trapping space 22 forwardly of the ring, and the beveled surface 19, in connection with the wall 23 of the groove 4, forms a lubricant trapping space 24, rearwardly of the ring, but of smaller area than the space 22, and which is closed thereto by the engagement of the edge 16 of the ring with the cylinder wall 14.

The rear trapping space 24 formed by one ring is connected to the forward trapping space 25 provided by an adjacent ring by the space 26 between a land 5 and the cylinder wall 14.

Figure 2:
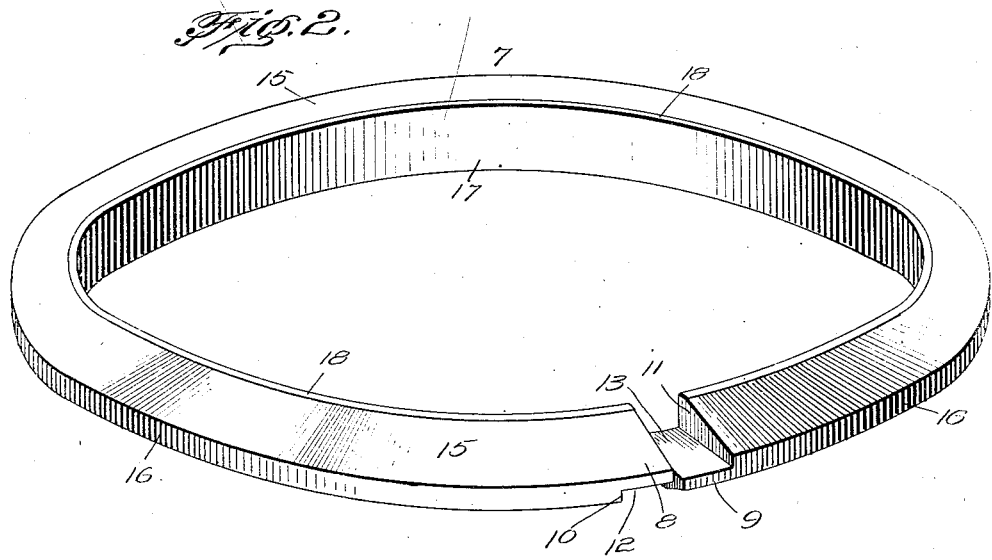
Fig. 2 is a perspective view of the piston ring.

In Fig. 1 of the drawings, the forward groove 4 of the piston head 2, is provided with a ring 27, which has its rear face beveled as at 28, in the same manner as the rear face of the ring shown in Fig. 2. The forward face of the ring 27 is flat throughout. Otherwise, than as stated, the ring 27 is of the same construction as the ring shown in Fig. 2 of the drawings.

The diameter and construction of the ring provides means for trapping the lubricant to prevent the oil from being pumped into the combustion chamber of the engine, and it furthermore provides means to increase lubrication, due to the fact that the lubricant is trapped, and although the preferred construction is as described and illustrated, yet changes in the details of the ring can be had which will fall within the light of the invention as claimed.

What I claim is:

A piston ring comprising a compressible split body portion having its forward and rear faces each bevelled to provide a plane surface at the outer edge of said body of less width than the inner edge thereof and further to provide a plane surface at the inner portion of each of said faces, the bevel on said forward face being of materially greater width than the bevel on said rear face whereby the plane surface on the rear face will be of greater width than the plane surface on said forward face, the plane surface on the forward face being of less than half the width of the bevelled surface of said face, the plane surface on the rear face being of the same width as the width of the bevelled surface on said face, the bevel on the rear face extending at a greater angle than the bevel on the forward face, the plane surface on the outer edge of said body portion being substantially half the width of the inner edge of said body, and the split terminal portions of said body overlapping each other and formed with oppositely disposed shoulders of triangular contour and oppositely disposed circumferentially extending opposed flat edges.

In testimony whereof, I affix my signature hereto.

DOCK J. PEELER.